May 13, 1941.  T. B. DOE  2,241,701
POWER TRANSMISSION
Filed May 26, 1937
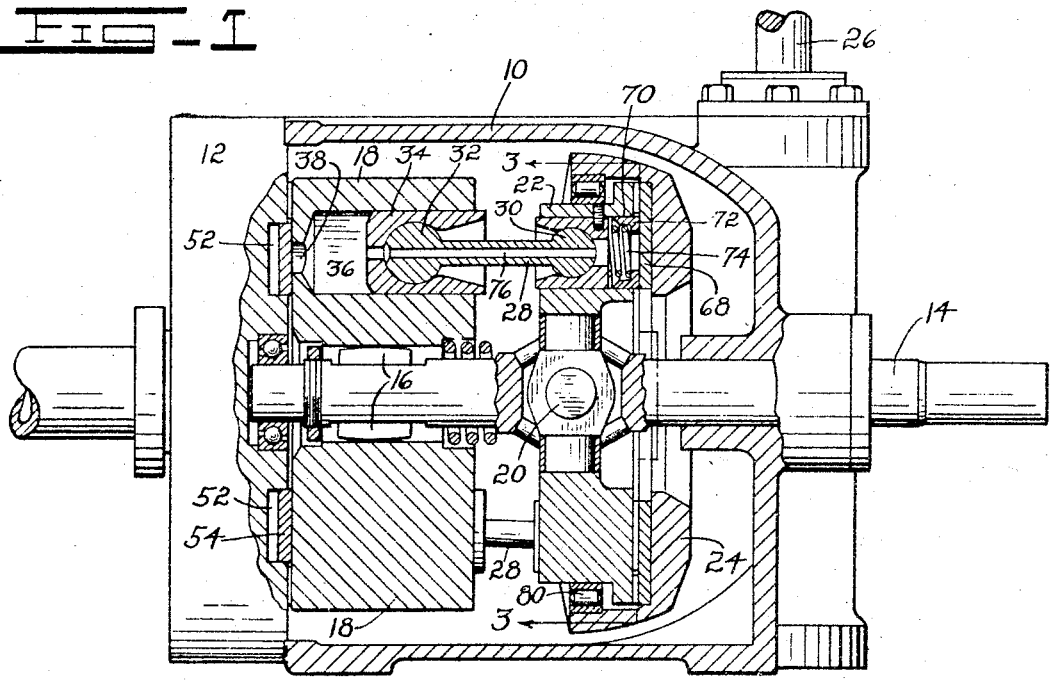
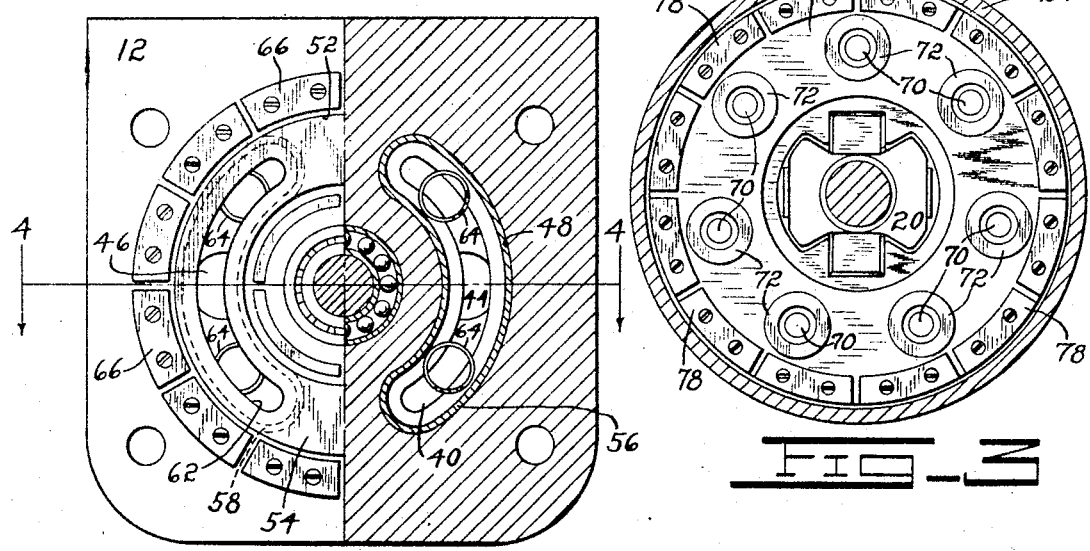
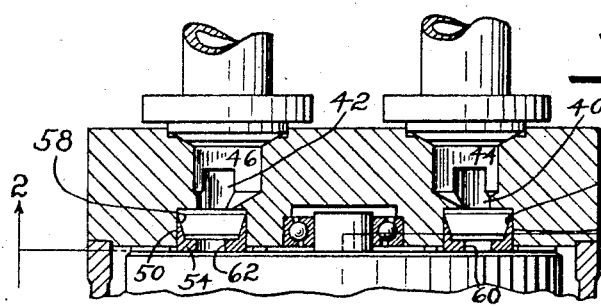
INVENTOR
*Thomas B. Doe*
BY
*Ralph L. Tweedale*
ATTORNEY Patented May 13, 1941

2,241,701

UNITED STATES PATENT OFFICE 2,241,701

POWER TRANSMISSION

Thomas B. Doe, New York, N. Y., assignor to The Waterbury Tool Company, Waterbury, Conn., a corporation of Connecticut Application May 26, 1937, Serial No. 144,897

7 Claims. (Cl. 103—162)

This invention relates to power transmissions and more particularly to those of the type comprising two or more fluid pressure energy translating devices, one of which may function as a pump and another as a fluid motor. The invention is particularly applicable to such devices of the type having parallel axial cylinder bores with swash plate mechanism for reciprocating the pistons therein together with a plate type of rotary valve mechanism.

Devices of this character, particularly those in which the cylinder barrel and pistons revolve against a stationary valveplate while the pistons are reciprocated by a socket ring rotating at a fixed or variable angle to the plane of rotation of the cylinder barrel, involve rather high end thrusts between the cylinder barrel and the valveplate and between the socket ring and the tilting box or angle box which determines the plane of rotation of the former. If high efficiencies are to be maintained, not only must the leakage occurring between the cylinder barrel and the valveplate be reduced to a minimum but this must be done without causing excessive friction.

While these requirements have been met in the prior art for machines working at fairly high pressures if it be attempted to operate at much higher pressures, difficulties have been experienced due to deflections in the valveplate caused by the high localized stresses set up therein. Although special compositions of bronze have been developed for securing both high strength and low friction coefficients in the valveplate, it has been extremely difficult even with the best materials available to avoid deflection difficulties when operating at extremely high pressures.

It has been customary in the past to design for maximum rigidity in the valveplate and by accurate machining to provide as nearly a perfect flat on the valveplate surface as it is possible to obtain, expecting that the valveplate has sufficient rigidity to maintain its flatness under maximum load. According to the present invention the actual valving surface of the valveplate which runs against the cylinder barrel is purposely made sufficiently flexible to permit deformation under normal loads and is so constructed as to be constantly urged by fluid pressure forces against the face of the cylinder barrel.

It is an object therefore to provide a valveplate construction permitting operation at higher pressures than those heretofore possible and involving the use of a steel valveplate providing special means for insuring low friction losses as well as low leakage losses.

The principles utilized in solving the valveplate problem are also applicable to the thrust bearings at the socket ring and it is a further object to provide an improved hydraulically balanced thrust bearing for this purpose.

Further objects and advantages of the present invention will be apparent from the following description, reference being had to the accompanying drawing wherein a preferred form of the present invention is clearly shown.

In the drawing:

Fig. 1 is a longitudinal cross section of a fluid pressure energy translating device incorporating a preferred form of the present invention.

Fig. 2 is a cross section on line 2—2 of Fig. 4.

Fig. 3 is a cross section on line 3—3 of Fig. 1.

Fig. 4 is a cross section on line 4—4 of Fig. 2.

The invention has been illustrated as applied to the well-known "Waterbury" type of variable displacement pump or fluid motor. Such a mechanism comprises briefly a casing 10 having its left-hand open end closed by a valveplate 12. A shaft 14 is journalled in the casing at the valveplate and carries slidably mounted thereon by keys 16 a cylinder barrel 18. Connected to the shaft by a universal joint 20 is a socket ring 22 which is journalled in a tilting box 24. The tilting box is journalled on trunnions, not shown, for pivotal movement about a horizontal axis at right angles to and intersecting the shaft 14. A control shaft 26 is provided for adjusting the inclination of the tilting box 24 relative to the plane of the valveplate 12 through a connecting linkage, not shown. The socket ring carries a plurality of connecting rods 28 which are articulated by ball joints 30 to the socket ring and by ball joints 32 to pistons 34 which reciprocate in the bores 36 of the cylinder barrel. Each of the bores is provided with a cylinder port 38 of considerably smaller area than the cross section of the bore 36 and which opens into the left-hand or front face of the barrel 18.

The special construction of the valveplate mechanism is illustrated particularly in Figs. 2 and 4. The valveplate is preferably formed from plate stock of high strength steel and is provided with two arcuate valve ports 40 and 42 which communicate with pipe connections 44 and 46 respectively. Adjacent the right-hand face of the valveplate 12, the ports 40 and 42 open into enlarged pockets 48 and 50 which are of the same general shape as the valve ports 40 and 42 but of greater width and length. Between the ends of the pockets 48 and 50 there is provided an annular groove 52 which is of the same radial width as the pockets 48 and 50 but of less depth in the direction of the thickness of the valveplate. The valve ports 40 and 42, the pockets 48 and 50, and the annular groove 52 are preferably formed by end milling operations from solid stock.

Slidably mounted within the groove 52 and the pockets 48 and 50 is a one-piece sealing member 54 which is comprised of an annular band of good bearing material, preferably bronze, having integral sausage-shaped flanges 56 and 58 which extend into and closely fit the walls of the pockets 48 and 50. The upstanding edges of these flanges are tapered down to a sharp edge as appears in Fig. 4. The tapered form gives a slight flexibility to the edge of the flange enabling it to engage the walls of the pocket in a fluid tight manner. The right-hand face of the sealing member 54 in Fig. 1 is flat and in abutting relation with the left-hand face of the cylinder barrel 18 and is provided with a pair of arcuate ports 60 and 62 extending therethrough. Light springs 64 are mounted between the bottom of the pockets 48 and 50 and the under face of the sealing member 54 to maintain the latter in contact with the cylinder barrel initially when no fluid pressure exists in the system.

Radially outward from the sealing member 54 are provided a plurality of auxiliary bearing pads 66 which are formed of suitable bearing material and rigidly secured to the valve-plate 12. The areas of the top face of the sealing member 54 and of the ports 38 and 40 are preferably so correlated with the areas of the cylinder bores 36 as to provide a net fluid pressure force on the cylinder barrel 18 of very small magnitude tending to urge the same against the fixed auxiliary bearing pads 66.

The tilting box 24 is provided with a hardened steel bearing plate 68 forming the stationary member of the thrust bearing for the socket ring 22. Behind each ball socket 30 the socket ring is provided with pockets 70 (see Fig. 3) in which are slidably mounted individual sealing members 72 of a construction somewhat similar to the sealing member 54. The sealing members 72, however, are not connected with one another by any flat band portion as are the two flange portions 56 and 58 of the sealing member 54. Light springs 74 may be provided for maintaining initial contact between the sealing members 72 and the bearing plate 68. The pistons 34 and connecting rods 28 are provided with central bores 76 through which fluid from the cylinders 36 may be conducted to the chambers 70. The socket ring is provided with auxiliary bearing pads 78 rigidly secured thereto and abutting the bearing plate 68. A radial bearing 80 preferably of the roller type is provided for taking radial loads when the tilting box 24 is inclined away from the neutral position illustrated. The areas of the pockets 70 are preferably so correlated with the area of the cylinder bores 36 as to provide only a small net load on the socket ring auxiliary bearing pads 78 when the tilting box 24 is inclined to full stroke position.

In operation considering the device disclosed to be used as a variable displacement pump and to be connected at the pipe connections 44 and 46 to a suitable load device such as a fixed displacement fluid motor, not shown, rotation of the shaft 14 carries with it the cylinder barrel 18 and the socket ring 22. So long as the tilting box 24 is mounted in a position parallel to the valveplate 12, the pistons are carried around in the cylinder bores without causing reciprocation thereof in an axial direction. If the tilting box 24 be inclined away from the neutral position illustrated, the pistons will be caused to reciprocate in the bores 36, their stroke depending upon the degree of inclination of the tilting box 24. Fluid is thus caused to be withdrawn through the connection 46, for example, valve port 42, valve port 62, and cylinder ports 38 into the bores 36 on one side of the machine and to be discharged through the ports 38, 60 and 40, and pipe connection 44 on the opposite side of the machine.

Assuming the port 40 to be the pressure side of the system for the moment, it will be seen that the sealing member 54 is on that side of the machine subjected to full working pressure over its bottom side, while on its top side it is subjected to substantially half that pressure due to the pressure drop occurring in the fluid film between the inner edge of the port 60 and the outer edge of the member 54. There is thus a predominate force urging the member 54 into fluid sealing engagement with the left-hand face of the cylinder barrel 18. The latter is maintained in running contact with the auxiliary pads 66 by the slight predominance of fluid pressure force on the barrel in the direction of the valveplate. The sealing member 54 provides a tight seal between its front face and the barrel 18 while the feather edges of the flanges 58 and 56 provide a corresponding tight seal with the edges of the pockets 48 and 50. Leakage is thus effectively held to a minimum. Since the member 54 is of light cross section and is not rigidly secured to the valveplate 12, it is permitted to partake of such minor deflections as are necessary to keep the same in contact witih the cylinder barrel and with the pockets 48.

The thrust bearing operates in a manner analogous to that described for the valveplate, the sealing members 72 effectively confining the body of fluid in the pockets 70 against leakage along the face of the bearing member 68. It will be seen that the piston, connecting rods, and socket ring are thus supported to a large extent on a body of fluid acting directly on the face of the bearing member 68. The small force not thus supported is provided by the fluid acting against the inner surface of the sealing member 72 and by the force transmitted from the bearing member 68 to the auxiliary bearing pads 78.

While the form of embodiment of the invention as herein disclosed, constitutes a preferred form, it is to be understood that other forms might be adopted, all coming within the scope of the claims which follow.

What is claimed is as follows:

1. In a fluid pressure energy translating device of the type having a relatively rotatable cylinder barrel and valveplate having flat abutting faces, means forming a pair of arcuate valve ports in the valveplate, means forming individual cylinder ports in the barrel, said ports opening into the flat faces of their respective members, and a sealing member movably mounted in the valveplate and formed with an annular flat face contacting the cylinder barrel, said member having arcuate ports within the annular face and communicating with the valve ports, and a pair of upstanding flanges surrounding the arcuate ports in said member and slidably engaging the arcuate ports in the valveplate.

2. In a fluid pressure energy translating device of the type having a relatively rotatable cylinder barrel and valveplate having flat abutting faces, means forming a pair of arcuate valve ports in the valveplate, means forming individual cylinder ports in the barrel, said ports opening into the flat faces of their respective members, and a sealing member movably mounted in the valveplate and formed with an annular flat face contacting the cylinder barrel, said member having arcuate ports within the annular face and communicating with the valve ports, and a pair of upstanding flanges surrounding the arcuate ports in said member and slidably engaging the arcuate ports in the valveplate, said upstanding flanges being tapered in cross section and slightly flexible to engage the walls of the valve ports in a substantially fluid tight manner.

3. In a fluid pressure energy translating device of the type having a relatively rotatable cylinder barrel and valveplate having flat abutting faces, means forming a pair of arcuate valve ports in the valveplate, an annular groove in the face of the valveplate, intercepting said valve ports and extending therebetween, means forming individual cylinder ports in the barrel, said ports opening into the flat faces of their respective members, and a sealing member movably mounted in said groove and formed with a continuous annular flat face contacting the cylinder barrel around a complete circle, said member having arcuate ports within the annular face and communicating with the valve ports, and means for minimizing leakage between the valveplate and sealing member.

4. In a fluid pressure energy translating device of the type having a relatively rotatable cylinder barrel and valveplate having flat abutting faces, means forming a pair of arcuate valve ports in the valveplate, means forming individual cylinder ports in the barrel, said ports opening into the flat faces of their respective members, and a sealing member movably mounted in the valveplate and formed with a continuous annular flat face contacting the cylinder barrel around a complete circle, said member having arcuate ports within the annular face and communicating with the valve ports, means for minimizing leakage between the valveplate and the sealing member, and means forming an auxiliary bearing surface between the valveplate and the cylinder barrel for carrying a small portion of the thrust reaction on the valveplate, the major portion of the thrust reaction being exerted against the valveplate by the body of fluid between the valveplate and the sealing member.

5. In a fluid pressure energy translating device of the expansible chamber type, a thrust bearing construction comprising relatively rotatable members between which a thrust force is exerted by fluid pressure within the expansible chambers, conduit means communicating between the chambers and the space between said members, sealing means carried by one of said members and movable relative thereto toward and away from the other member, said sealing means acting to confine a body of fluid which is in communication with the chambers and in contact with the other member over an area sufficient to sustain a major portion of the thrust force between said members, said sealing means including a thin flexible wall forming a fluid tight slidable joint between the sealing means and said one member.

6. In a fluid pressure energy translating device of the expansible chamber type, a thrust bearing construction comprising relatively rotatable members between which a thrust force is exerted by fluid pressure within the expansible chambers, conduit means communicating between the chambers and the space between said members, sealing means carried by one of said members and movable relative thereto toward and away from the other member, said sealing means acting to confine a body of fluid which is in communication with the chambers and in contact with the other member over an area sufficient to sustain a major portion of the thrust force between said members, said sealing means including a thin flexible wall forming a fluid tight slidable joint between the sealing means and said one member and means forming an auxiliary bearing surface between said members for sustaining the remainder of the thrust force.

7. In a fluid pressure energy translating device of the type having a relatively rotatable cylinder barrel and valveplate having flat abutting faces, means forming a pair of arcuate valve ports in the valveplate, means forming individual cylinder ports in the barrel, said ports opening into the flat faces of their respective members, and a sealing member movably mounted on the face of the valveplate and formed with a continuous annular flat face contacting the cylinder barrel around a complete circle, said member having arcuate ports within the annular face and communicating with the valve ports, and engaging the valveplate with a fluid sealing engagement extending completely around the periphery of each valve port individually.

THOMAS B. DOE.